United States Patent [19]
Collis

[11] Patent Number: 5,108,121
[45] Date of Patent: Apr. 28, 1992

[54] BOAT TRAILER EXTENSION ARM

[76] Inventor: Alan Collis, 10 Caber Street, Moss Vale, New South Wales 2577, Australia

[21] Appl. No.: 741,972

[22] Filed: Aug. 6, 1991

Related U.S. Application Data

[63] Continuation of Ser. No. 472,857, Jan. 31, 1990, abandoned.

[30] Foreign Application Priority Data

Feb. 1, 1989 [AU] Australia .......................... 48680/90

[51] Int. Cl.$^5$ .............................................. B60P 3/10
[52] U.S. Cl. .................... 280/414.1; 280/656; 403/93
[58] Field of Search ............. 280/47.331, 414.1, 414.3, 280/656; 414/529, 530, 531, 532, 533, 534, 535; 403/92, 93, 96; 114/344

[56] References Cited

U.S. PATENT DOCUMENTS

| | | | |
|---|---|---|---|
| 3,021,969 | 2/1962 | Peake et al. | 280/414.1 X |
| 3,031,093 | 4/1962 | Holsclaw | 414/533 |
| 3,056,517 | 10/1962 | Trumbull | 280/414.1 X |
| 3,204,790 | 9/1965 | Collins | 414/534 |
| 3,447,815 | 6/1969 | West | 414/534 X |
| 3,837,509 | 9/1974 | Glodrick | 280/414.1 X |
| 3,868,030 | 2/1975 | Bell | 280/414.1 X |
| 4,209,279 | 6/1980 | Aasen | 280/414.1 X |
| 4,268,211 | 5/1981 | Schwebke | 414/532 X |
| 4,340,332 | 7/1982 | Davies | 280/414.1 X |
| 4,765,794 | 8/1988 | Stephens et al. | 280/414.1 X |
| 4,801,152 | 1/1989 | Elliott et al. | 280/47.34 |

FOREIGN PATENT DOCUMENTS

| | | | |
|---|---|---|---|
| 650630 | 9/1937 | Fed. Rep. of Germany | 403/96 |
| 486016 | 12/1917 | France | 403/96 |
| 186803 | 10/1922 | United Kingdom | 403/96 |

Primary Examiner—Andres Kashnikow
Assistant Examiner—Brian L. Johnson
Attorney, Agent, or Firm—Knobbe, Martens, Olson & Bear

[57] ABSTRACT

A device for attachment to a boat trailer including an extension arm for facilitating the launching of a boat into the water, and loading of the boat onto the trailer from the water. The extension arm consists of a first elongate member to be attached to, and to extend horizontally from, a side of the trailer, and a second elongate member which is longitudinally extendable and is coupled at one end to the first elongate member so as to extend generally perpendicularly to the first member. The second member has a guide member at it's second end for guiding the boat during launching/loading operations. Preferably, the coupling between the first and second members allows a selection of angular positions of said second member about a horizontal axis defined by the first member.

9 Claims, 2 Drawing Sheets

BOAT TRAILER EXTENSION ARM

This application is a continuation of application Ser. No. 07/472,857, filed Jan. 31, 1990 and now abandoned.

BACKGROUND OF THE INVENTION

This invention relates to boat trailers, and more particularly, to devices for facilitating the launching of a boat from a trailer into the water and loading of the boat onto the trailer from the water.

It is well known that difficulties arise when launching or loading boats to or from water due to the action of the current, tide or wind, which moves the boat out of line with respect to the trailer. The boat can swing from side to side and trying to winch it back onto a trailer can be a very difficult task.

One example of a device used to facilitate launching and loading of boats to and from the water comprises spring-loaded roller arms arranged on either side of the bow of the boat which is thereby automatically centered between the arms. As retrieval of the boat progresses, the arms are pressed downwardly to follow the shape of the hull. Such spring-loaded roller arms, however, are relatively expensive, complicated and require complex fitting to a boat trailer.

SUMMARY OF THE INVENTION

Therefore, it is an object of the present invention to provide a device which can be easily fitted to a boat trailer, is simple to manufacture and which will hold a boat in position for launching or winching back onto a trailer.

Accordingly, the invention provides an extension arm for a boat trailer, the arm comprising a first elongate member adapted for mounting on the boat trailer such that the member extends substantially horizontally from a side of the trailer, a second, extendible elongate member having coupling means at one end thereof for coupling the second member substantially perpendicularly to a second end of the first member such that the second member extends, in use, substantially parallel to the axis of a boat to be launched from, or loaded onto, the trailer, and guide means attached to a second end of the second member.

Preferably, at least one mounting device is provided for mounting the first elongate member on the boat trailer. Conveniently, two mounting devices are provided, one for each side of the trailer. Preferably, the first elongate member is slidably mountable in the mounting device(s) so as to be adjustable for different boat widths.

In a preferred embodiment of the present invention, the first and second members include cooperating coupling means which enable the first and second members to be coupled together substantially perpendicularly and at any desired angle about a horizontal axis. The cooperating coupling means preferably comprises a first plate attached to the second end of the first member and having a plurality of holes therein arranged in a circle about the axis of the first member, a second plate attached to a side of the second member at the first end thereof and having a plurality of holes therethrough in substantially the same arrangement as the holes in the first plate so that, when the first and second members are coupled together, the holes in the first and second plates are adjacent one other, and a pin for insertion into an adjacent hole in the first and second plates so as to couple the first and second members perpendicularly together at a desired angle.

Preferably, the guide means comprises a roller. The roller preferably rotates about an axis which is substantially perpendicular to the second member. The axis of the roller can, if desired, also be allowed to rotate about a substantially horizontal axle attached to the second end of the second member.

BRIEF DESCRIPTION OF THE DRAWINGS

The invention will now be more fully described by way of example with reference to the drawings, of which.

DETAILED DESCRIPTION OF ONE EMBODIMENT OF THE INVENTION

Figure 1:
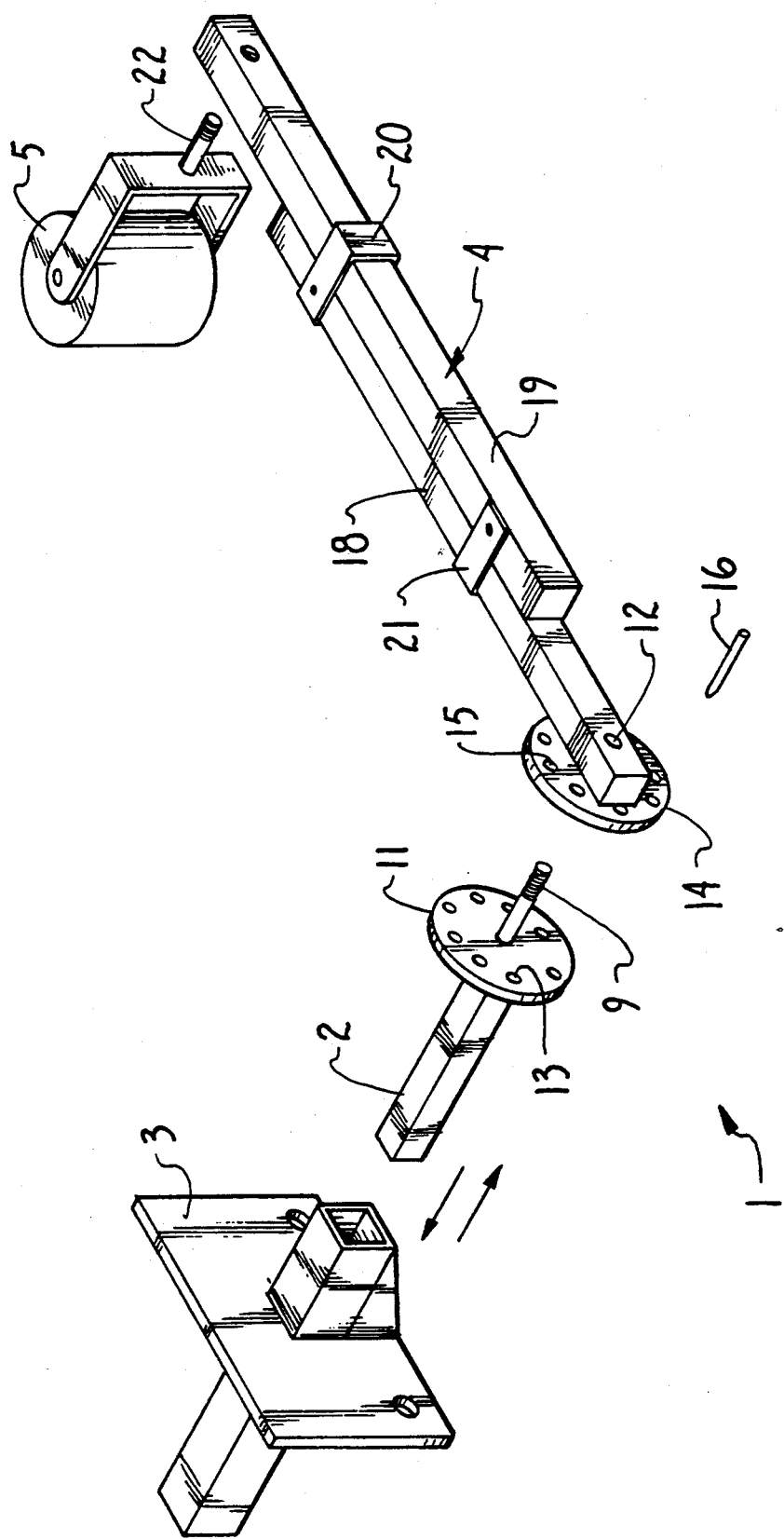
FIG. 1 shows, in exploded view, one embodiment of an extension arm according to the invention.

Thus, there is shown in the drawings, one embodiment of a boat trailer extension arm, generally designated by reference numeral 1, according to the invention. The extension arm consists of a first longitudinal member 2 having a first end for mounting on a side of the boat trailer and a second member 4 having a guide roller 5 attached to a first end of the second member 4.

Figure 2:
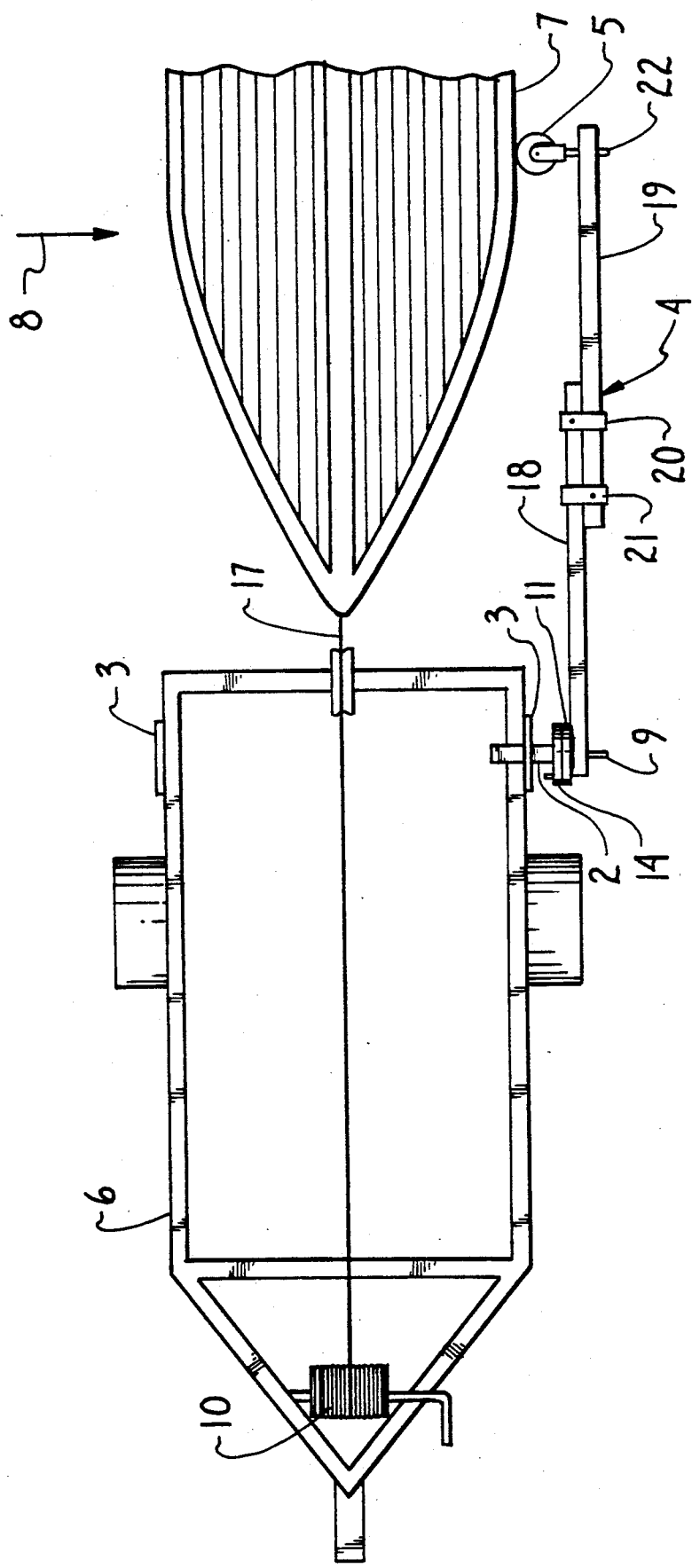
FIG. 2 shows, in diagrammatic form, the arm of FIG. 1 in position on a boat trailer used for winching up a boat.

Two mounting brackets 3 are provided on the boat trailer 6, one on either side as shown in FIG. 2. Each mounting bracket 3 is adapted to slidably receive and mount the first member 2 onto the side of the boat trailer 6. The mounting brackets can be easily fitted to the trailer 6, for example by means of two bolts (not shown). Thus, the first member 2 can be fitted to whichever side of the trailer is on the downwind or downstream side of a boat 7 and can be slidably adjusted in the bracket 3 to extend from the trailer a distance appropriate for the width of the boat being winched. Wind or current is designated in FIG. 2 by arrows 8 which show the direction in which the boat 7 is being forced by the wind, tide or current.

The first member 2 is mounted on the trailer 6 so as to extend out sideways from the side of the trailer and is mounted generally horizontally. The second end of the first member 2 is provided with a tenon 9 for fitting into a cooperating socket 12 provided through the side of second member 4 at the second end thereof. The second member 4 is therefore fitted generally perpendicularly to the first member 2 and is arranged to lie generally parallel to the boat 7. Thus, if the boat 7 is at a different level to that of the trailer 6, then the second member 4 will be at an angle to the horizontal so as to lie generally parallel to the boat as it is being winched from or into the trailer 6 by means of winch 10.

In order to couple the first and second members 2 and 4 at a desired angle, there is provided a cooperating coupling device comprising a first generally circular plate 11 mounted on the second end of the first member 2 over the tenon 9 and having a number of holes 13 therein in a substantially circular arrangement and a second generally circular plate 14 having a number of holes 15 therein in substantially the same arrangement as the holes 13 in the first plate 11 and being mounted on the side of the second member 4 over the socket 12 at the second end thereof so that the holes 13 and 14 overlap. When the tenon 9 is fitted into socket 12, it will be appreciated that second member 4 can extend perpendicularly from the first member 2 at any angle to the horizontal. Therefore, a pin 16 is provided for insertion into one of the overlapping holes 13 and 15 in each of the plates 11 and 14. This pin is made of a sufficiently strong material that it will hold the weight of the second member 4 at the desired angle to the horizontal. The desired angle is one which will enable the second member to lie substantially parallel to the angle of the boat 7 when it is being winched into or out of the trailer 6 using the winch 10 and rope 17.

As can be seen in the drawings, the second member 4 is made of first and second parallel arms 18 and 19 which are slidably coupled together by means of two straps 20 and 21 which are attached to the first and second arms 18 and 19 respectively so as to provide a channel through which the second and first arms 19 and 18 respectively may slide. Thus, the second member 4 can be extended as required to extend the guide roller 5 over the water's edge so as to hold the boat 7 in line with the trailer 6 against the force of the wind, tide or current 8.

The guide roller 5 is held against the side of the boat by the force of the wind, tide or current pushing the boat 7 and rolls against the side of the boat as the boat is moved into or out of the trailer 6. The roller 5 is mounted at the first end of second member 4 on an axle 22 which allows the roller to swivel to the correct angle to lie against the side of the boat.

It will be appreciated that the first member 2, second member 4 and guide roller 5 are ordinarily dismounted from one other and that they are mounted onto the trailer only when required for use. It will further be appreciated that although the extension arm has only been described in one particular embodiment, various obvious modifications and improvements can be made which nevertheless remain within the scope of the invention.

What I claim is:

1. An extension arm for a boat trailer, the arm comprising a first elongate member with means adapted for mounting on the boat trailer such that the member extends substantially horizontally from a side of the trailer, a second, extendible elongate member having coupling means at one end thereof for coupling the second member substantially perpendicularly to a second end of the first member such that the second member extends, in use, substantially parallel to the longitudinal axis of a boat to be launched from, and loaded onto, the trailer, and wherein the length of said second, extendible elongate member is adjustable in a direction parallel to said longitudinal axis, and guide means attached to a second end of the second member, wherein the first and second members include cooperating coupling means which enable the first and second members to be coupled together substantially perpendicularly and at any one of a plurality of discrete angles about a horizontal axis, and wherein the cooperating coupling means comprises a first plate attached to the second end of the first member in a plane perpendicular to the longitudinal axis of the first member, a second plate attached to a side of the second member at the first end thereof and having a plurality of holes therethrough in substantially corresponding arrangement as the holes in the first plate so that, when the first and second members are coupled together, the holes in the first and second plates are adjacent each other, and a pin for insertion into an adjacent hole in the first and second plates so as to couple the first and second members perpendicularly together at a desired angle.

2. An extension arm for a boat trailer according to claim 1, further comprising at least one mounting device for mounting the first elongate member on the boat trailer.

3. An extension arm for a boat trailer according to claim 2, wherein two mounting devices are provided, one for each side of the trailer.

4. An extension arm for a boat trailer according to claim 2, wherein the first elongate member is slidably mountable in the mounting device so as to be adjustable for different boat widths.

5. An extension arm for a boat trailer according to claim 1, wherein the guide means comprises a roller.

6. An extension arm for a boat trailer according to claim 5, wherein the roller rotates about an axis which is substantially perpendicular to the second member.

7. An extension arm for a boat trailer according to claim 6, wherein the axis of the roller is free to rotate about a substantially horizontal axle attached to the second end of the second member.

8. An extension arm for a boat trailer according to claim 1, further comprising a tenon attached to the second end of the first member, said tenon sized to fit into a cooperating socket provided in the first end of the second member.

9. In a boat trailer, the improvement of a coupling apparatus comprising:
a first member having first and second ends wherein the first end includes a means adapted for mounting on the boat trailer;
a second member having first and second ends;
means for coupling the first and second members which enable the first and second members to be coupled together substantially perpendicularly and at any one of a plurality of discrete angles about a horizontal axis, and wherein the cooperating coupling means comprises a first plate attached to the second end of the first member in a plane perpendicular to the longitudinal axis of the first member and having a plurality of holes therein arranged in a circle, a second plate attached to a side of the second member at the first end thereof and having a plurality of holes therethrough in substantially corresponding arrangement as the holes in the first plate so that, when the first and second members are coupled together, the holes in the first and second plates are adjacent each other, and a pin for insertion into an adjacent hole in the first and second plates so as to couple the first and second members perpendicularly together at a desired angle, wherein a tenon is attached to the second end of the first member, said tenon sized to fit into a cooperating socket provided in the first end of the second member.

* * * * *